Aug. 8, 1967 Z. N. HARRIS 3,335,208
PROCESS FOR PRODUCING THIN-WALL PLASTIC TUBING
Original Filed July 19, 1962

ZACHARY N. HARRIS
INVENTOR.

BY Lyon & Lyon
ATTORNEYS

Aug. 8, 1967

Z. N. HARRIS 3,335,208

PROCESS FOR PRODUCING THIN-WALL PLASTIC TUBING

Original Filed July 19, 1962

ZACHARY N. HARRIS
INVENTOR.

BY Lyon & Lyon

ATTORNEYS.

United States Patent Office 3,335,208
Patented Aug. 8, 1967

3,335,208
PROCESS FOR PRODUCING THIN-WALL
PLASTIC TUBING
Zachary N. Harris, Fresno, Calif., assignor to The Dow
Chemical Company, Midland, Mich., a corporation of
Delaware
Continuation of application Ser. No. 211,064, July
19, 1962, which is a continuation of application
Ser. No. 524,876, July 28, 1955. This application
May 16, 1966, Ser. No. 557,334
5 Claims. (Cl. 264—95)

This application is a continuation of application Ser. No. 211,064, filed July 19, 1962, which is a continuation of application Ser. No. 524,876, filed July 28, 1955, both abandoned.

This invention relates to the production of plastic film, and has particular reference to a novel and improved dry process for producing thin-wall, continuous, seamless tubing and sheeting from thermoplastic organic materials.

One more or less conventional dry method for the continuous production of thin-wall thermoplastic tubing comprises extruding a thermoplastic, in a molten condition, through an annular die in the form of a seamless tubing and, as the tubing is being withdrawn from the die and while it is in the plastic formative state, inflating the tubing with air or other gaseous medium, and maintaining the tubing so inflated until it is in a set condition, whereupon the tubing is flattened between pinch rolls into a double thickness. This double thickness may be wound into a cylindrical roll for storage and subsequent use as a tube, or prior to forming the roll, the tubing may be split to form a single-thickness sheet of double width wound into one roll, or two single-thickness sheets wound into two separate rolls.

While useful tubing or sheeting may be produced by this method, the product thereof is subject to certain disadvantages, one of which is that the wall thickness thereof is not uniform. Due to this non-uniformity and as a result of other inherent perculiarities of the process, which have not heretofore been fully realized or appreciated, upon winding of the flattened tubing, an uneven, humped roll is obtained. In case of plastics having a cold flow, the winding tension stretches the film over the humps so that when the film is unwound it will not lay flat, has ripples or billows therein and thus requires special precautions in the printing, conversion, etc., thereof.

Accordingly, one of the principal objects of this invention is to provide a process for producing thin-wall plastic tubing which is not subject to the above-mentioned and other disadvantages of the prior art.

Another object of this invention is to provide a method for extruding thin-wall plastic tubing which, when wound, will produce a substantially uniform roll.

Another object of this invention is to provide a method for extruding thermoplastic film which will lie flat after unwinding from a roll thereof.

Another object of this invention is to provide a novel process for extruding thermoplastic film of substantially uniform thickness.

Other objects and advantages of this invention it is believed will be readily apparent from the following detailed description of preferred embodiments thereof, when read in connection with the accompanying drawings.

Figure 1:
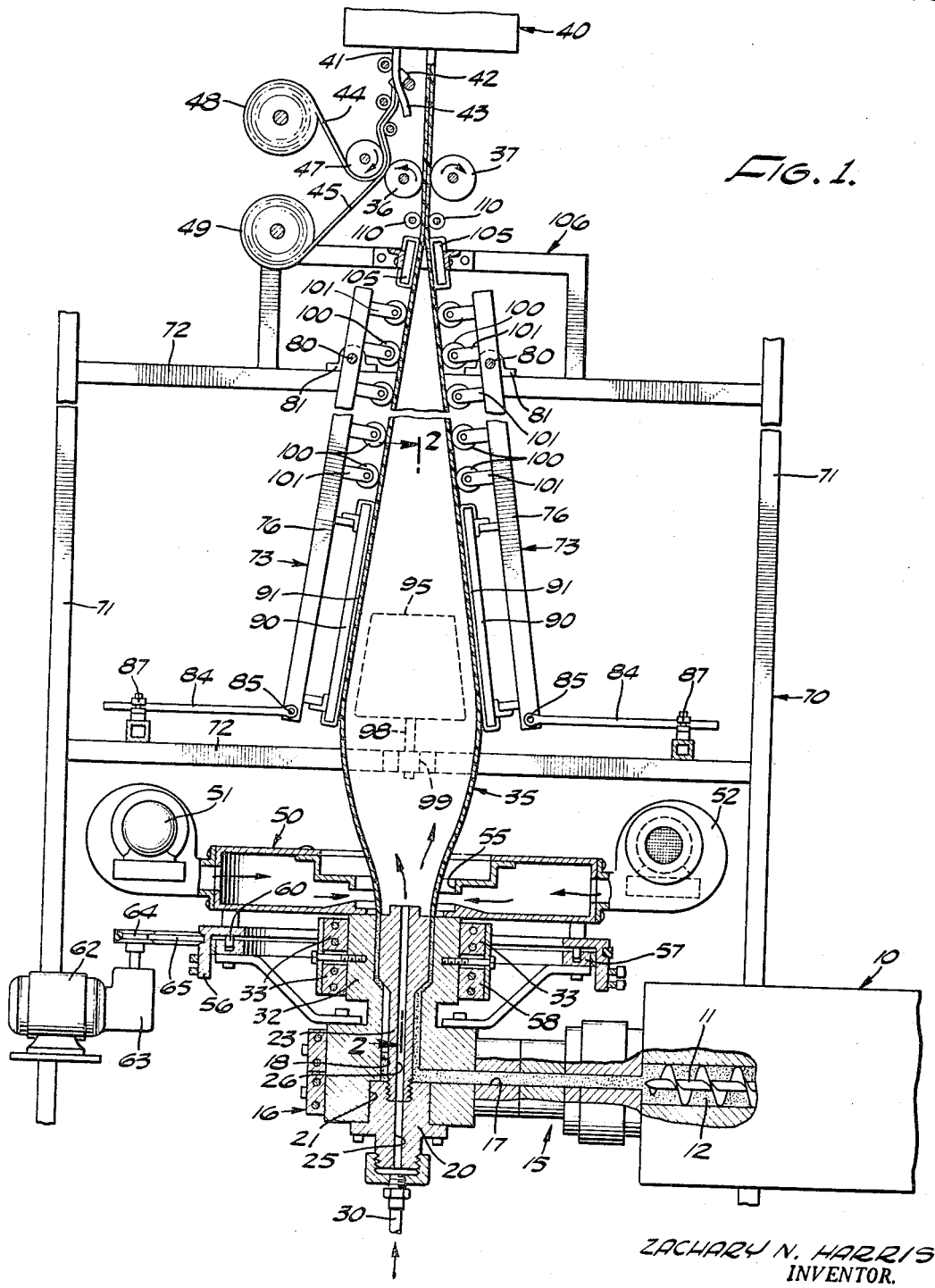
FIGURE 1 is a side elevation, with the extruder and other portions of the apparatus partly in section, of the apparatus of this invention.

Referring now to the drawings, the apparatus of this invention includes a conventional extruder generally indicated 10 and including a screw 11 which, upon rotation thereof, advances the thermoplastic 12 through the extruder. The extruder is provided with the usual hopper (not shown) for feeding the thermoplastic thereto, and with power means (not shown) for rotating the screw 11. The extruder head 15 is connected to a die 16, the bore 17 in the extruder head being connected at a 90° angle with the bore 18 of the die to permit feed of the thermoplastic material from the extruder to the die.

A plug member 20 is secured to the underside of the die, extending into a counterbore 21 therein, and secured to the upper side of the plug member is a die mandrel 23 which forms with the bore 18 and annulus for the passage of the thermoplastic material through and out of the die. The plug member and mandrel are provided with aligned, central bores 25 and 26 for introduction of a gaseous medium such as air through the line 30 to form the extruded thermoplastic material into an inflated bubble as shown. The air line 30 is provided with a valve, not shown, so that when the desired quantity of air has been introduced within the tubing, further supply thereof can be prevented. In the event the quantity of air within the tubing decrease as, for example, by leakage or otherwise, the requisite amount of air can be added by proper manipulation of the valve.

I have found that the uniformity in thickness of the extruded film can be controlled by selectively controlling the application of heat to the die 16 so that the heat may be varied at spaced areas about the periphery of the die orifice or annulus. This control is accomplished by applying to the die head 32 a plurality of resistance heating elements 33, the temperature of each of which may be individually controlled to increase or reduce the temperature in the several areas or zones about the periphery of the die head and die orifice.

The inflated thermoplastic tubing or bubble 35 is withdrawn from the die orifice in a substantially vertical direction by means of a pair of pinch rolls 36 and 37, each driven in the direction of the arrows by suitable means (not shown). Preferably, the peripheral speed of the rolls is such that as the tubing is drawn upwardly it is stretched while in the plastic formative state. By the term "plastic formative state" is meant that state of the plastic wherein it is in the unset or partly set condition and can be permanently formed or enlarged, as by stretching.

The rolls 36 and 37 also serve to collapse the tubing passed therebetween into a flattened, ribbon-like, double-thickness film which is drawn upwardly through an apparatus, generally indicated 40, for treating the film to render the same printable. The treated film, designated 41, is then passed downwardly against a pair of cutter members 42, one on each side of the film, which sever a narrow strip 43 on each side of the film so as to divide the double-thickness film into two single-thickness webs 44 and 45 which are drawn between rolls 36 and 47 and then separately wound into product rolls 48 and 49.

As the tubing 35 is withdrawn from the die it passes through an annular housing 50 which provides means for cooling the hot tubing. As shown in FIGURE 1, a pair of air blowers 51 and 52 are carried on the housing 50 and supply air thereto which passes therethrough in the direction of the arrows and out through the annular slot 55 to contact the outer surface of tubing wall. The housing 50 is secured to a pulley member 56 which in turn is rotatably carried on an annular ring 57 secured to the die 16 by means of bracket members 58. The ring 57 is provided with an annular bearing groove in which rides a bearing element 60 depending from the bottom of the pulley member. Means are provided for slowly rotating the pulley member and the housing about their axes and, as shown in the drawings, these means include a motor 62, gear box 63, pulley 64 driven thereby, and a belt 65 extending between the pulley 64 and pulley member 56.

While the apparatus thus far described will produce continuous thermoplastic tubing or sheeting, the products so produced are not entirely satisfactory from the standpoint that even though the tubing thickness may be substantially uniform, the tubing will not wind into even rolls, which, when unrolled, will lie flat for subsequent finishing operations. I have found that this is due to the fact that tubing produced with the apparatus thus far described will cool to the set condition while expanded in the form of a cylinder, or at the point wherein it is circular in cross section, and that, due to this circular configuration, it is inherently impossible to then continuously flatten the tubing in a wrinkle-free condition. I have found, however, that if the tubing is distorted in cross section, while it is still in the formative plastic state, from the true circular shape to an approximation of an ellipse, or at least to a non-circular cross section having a long axis parallel to the bite of the pinch rolls, and maintained in such shape until the plastic has reached the set condition, the tubing or sheeting will wind into substantially wrinkle-free product rolls and will lie flat when unwound. Theoretically, the cross-sectional shape of the set tubing should be an ellipse so that, as the tubing changes from this shape to the flattened condition at the bite of the pinch rolls, those portions of the tubing which would lie in two vertical planes, one coincident with, and the other normal to and centrally of the bite of the pinch rolls, would be of equal length. However, it has been found that in actual practice, the resilience and flexibility of the tubing is such that this theoretical optimum need only be approximated in order to produce wrinkle-free rolls.

Accordingly, means are provided for distorting or confining the plastic bubble to form a non-circular shape while it is still in the plastic formative state, and as shown in the drawings, these means may include a framework generally indicated 70 consisting of vertical frame members 71 and upper and lower horizontal frame members 72. A pair of rectangular frames 73 is operably connected to the framework 70, one on each side of the inflated bubble 35, each frame 73 comprising upper and lower horizontal members 74 and vertical side members 76. Each of the side members 76 is connected to a pin 80, each pin journaled in one of four bearing members 81 mounted on the upper horizontal frame members 72. Any desired angular relationship of the frames 73 with respect to the inflated bubble is obtained by means of arms 84, each pivotally connected by means of a pin 85 to the lower end of one of the side members 76, the arms being adjustably connected to the framework 70 by means of clamp members 87.

Figure 2:
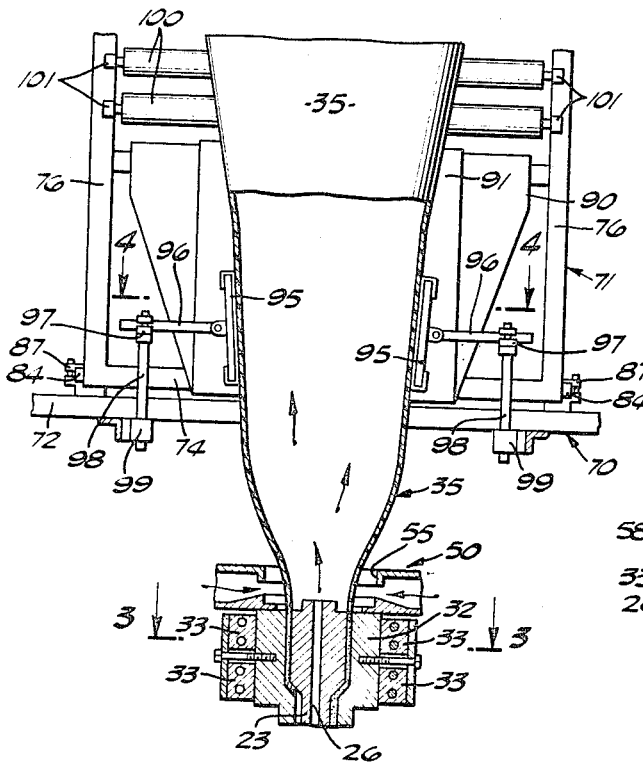
FIGURE 2 is a sectional elevation taken substantially on the line 2—2 of FIGURE 1.
Figure 3:
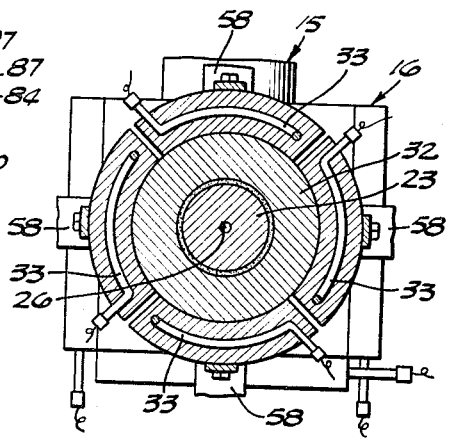
FIGURE 3 is a sectional view taken substantially on the line 3—3 of FIGURE 2.
Figure 4:
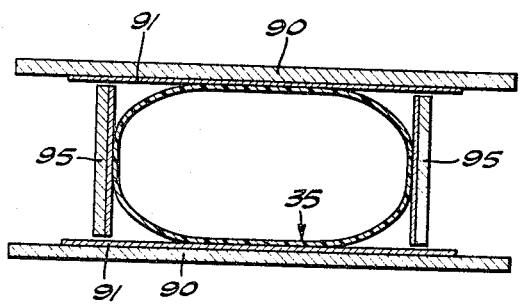
FIGURE 4 is a sectional view taken substantially on the line 4—4 of FIGURE 2.

Secured to each of the frames 73 and generally parallel thereto is a plate or panel 90, preferably of plywood or other material of relatively low thermal conductivity. Each of the panels is covered with a sheet 91 of relatively smooth material such as kraft paper or plastic film such as "Teflon," the frames 73 being so positioned that the sheets 91 contact the surface of the plastic bubble while it is in the plastic formative state and confine it in a non-circular cross-sectional shape until it has reached the set condition. A second pair of panels 95, generally similar to but smaller than the panels 90 are also provided, positioned on the framework with the planes thereof generally perpendicular to the planes of the panels 90. As shown best in FIGURE 2, the panels 95 are each supported at the end of an arm 96, each arm being adjustably supported by a clamp member 97 secured to the frame by means of rods 98 and brackets 99. The panels 90 and 95 cooperate by peripheral confinement to change the shape of the plastic bubble from one of circular cross-section to one of elongated, quadrilateral cross-section, as shown in FIGURE 4. Thus, panels 95 serve to prevent radial distortion of the still formative film along the intended fold lines until the film is no longer capable of being stretched by the force of the takeaway mechanism.

Mounted above the panels 90 on the frame 73 are a plurality of steel guide rolls 100, the rolls being journaled in suitable bearings 101 for free rotation with respect thereto. An additional pair of panels 105, again generally similar to the panels 90 and parallel thereto, are mounted above the rolls 100 on a superstructure 106. A pair of freely-rotating nip rolls 110 is positioned intermediate the panels 105 and the pinch rolls.

In operation, the selected thermoplastic material, preferably in granular or other subdivided form, is supplied to the hopper, from where it is fed into the extruder 10 and from which it is extruded through the orifice in the form of the seamless tubing. The tubing is continuously withdrawn from the orifice by the pinch rolls 36 and 37. An inflating medium such as air is introduced into the tubing through the bores 25 and 26, whereby the air is trapped in the section of the tubing between the die and the bite of the pinch rolls. The tubing, as it is withdrawn from the die, passes through the rotating annular housing 50 wherein it is subjected to the action of an annular stream of air or other cooling medium.

The inflated tube 35 then passes upwardly into contact with the panels 90 and 95, wherein the tube is confined or deformed from a circular cross-section to a non-circular quadrilateral section as shown in FIGURE 4. The panels 90 are sufficiently long so that the inflated plastic material changes from the plastic formative state to the set condition while it is still confined thereby in the non-circular cross section, the area of the confined cross-section progressively decreasing as the inflated tube moves toward the pinch rolls and until it reaches the set condition. When the tubing reaches the guide rolls 100 it has become set and is merely guided thereby in the direction of the pinch rolls. Panels 105 also serve to guide the tubing into the double-thickness condition obtained at the nip rolls 110, which rolls in turn iron out any small wrinkles to present the film to the pinch rolls in a substantially wrinkle-free condition.

The double-thickness film then passes through the treating unit 40, past the cutter members 42 and thence onto the product rolls 47 and 48.

The film is closely observed during the entire operation for differences in film thickness, and the temperatures of the heating elements 33 are independently adjusted to correct any irregularities. That is, if the film is overly thick in any particular area, the heating element in the zone of the die from which the thicker area is issuing is adjusted to increase the temperature, and vice versa.

Figure 5:
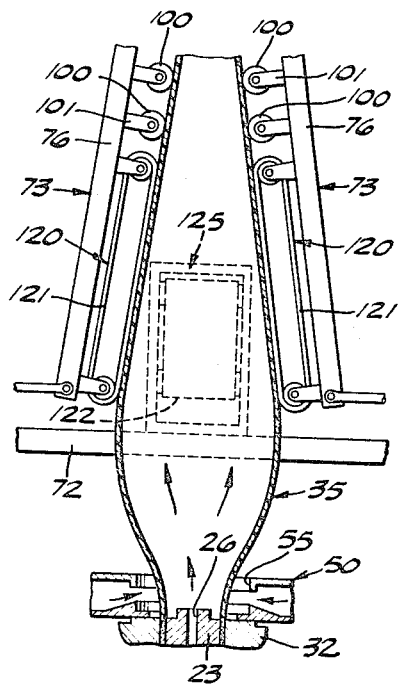
FIGURE 5 is a fragmentary side elevation, partly in section, of a modified form of the invention.

A modified form of the apparatus is illustrated in FIGURE 5. The apparatus here shown is identical with that described above, and the operation thereof is substantially the same, with the exception that the panels 90 and 95 are replaced by endless belt conveyor assemblies 120 and 125, including belts 121 and 122 of rubber or other flexible material. These belts perform the same function as the panels 90 and 95 in deforming the tubing into a general elliptical shape, resulting in obtaining a wrinkle-free roll and a flat web lay free from billows and edge droop, but they eliminate any planar distortion which might result from friction between the stationary panels and the moving tubing.

Though the invention has been successively operated in the production of flattened tubing of polyethylene, the invention is not restricted thereto. In general, the invention can be utilized with any thermoplastic material, mixtures thereof, and mixtures of synthetic rubbers with thermoplastic materials. Each thermoplastic substance or composition possesses certain properties which may make it necessary to determine by experiment the variables in the process which have to be balanced in order to produce tubing of the desired characteristics. This may be especially so with regard to the quantity of gaseous cooling medium since the temperature at the lips of the die may be different with different thermoplastic substances or compositions. Hereinafter is set forth a list of illustrative thermoplastic materials which can be used in this invention in addition to polyethylene:

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as, plasticizers, fillers, coloring agents, heat stabilizers, antioxidants, etc.

Having fully described my invention, it is to be understood that I do not wish to be limited to the details set forth but my invention is of the full scope of the appended claims.

I claim:

1. In the tube extrusion method of producing self-sustaining plastic film wherein an extruded, moving, initially formative tube is cooled to a plastically non-formative condition set against further stretching by a take away mechanism and is passed in the set condition between the bite of a pair of pinch rolls to form a double thickness web, the steps comprising extruding the film from an extrusion die and shaping it into a generally circular shape to form a tube, then engaging the tube with forming means to form it into a quadrilateral cross-section at least the central portion of each side of which is substantially flat, and thereafter progressing the tube between a pair of pinch rolls having their bite along a line substantially parallel to a line bisecting said quadrilateral along one axis thereof, said relationship between the bite line of the pinch rolls and the bisecting line of said quadrilateral being maintained during the progression of the film.

2. The method defined in claim 1 wherein said forming means engages the tube exteriorly of the tube, and the tube is maintained in engagement with the forming means by air pressure introduced into the tube.

3. The method defined in claim 1 wherein the forming means forms the tube into a quadrilateral cross-section having a major axis and a minor axis, the major axis being substantially parallel to the bite line of the pinch rolls.

4. The method defined in claim 1 wherein the tube is engaged in its movement between the forming means and the pinch rolls by means engageable with the two opposite sides thereof which are parallel to the bite line of the pinch rolls.

5. The method defined in claim 1 wherein the forming means is moved longitudinally with the tube.

References Cited

UNITED STATES PATENTS 2,697,852   12/1954   Bailey _____ 264—95 X

ROBERT F. WHITE, *Primary Examiner.*

A. R. NOEL, *Assistant Examiner.*